United States Patent Office 3,093,497
Patented June 11, 1963

3,093,497
SPRAYABLE BASIC REFRACTORY COMPOSITION FOR REPAIRING THE HOT BASIC REFRACTORY LININGS OF HIGH TEMPERATURE FURNACES, AND METHOD
Raymond J. Demaison, Bronx, N.Y., assignor to Quigley Company, Inc., a corporation of New York
No Drawing. Filed May 23, 1960, Ser. No. 30,778
11 Claims. (Cl. 106—59)

This invention is directed to a refractory coating composition for use in the maintenance of certain types of industrial furnaces which operate at high temperatures. The normal types of refractory walls and roofs upon which the instant composition can be applied are constructed of magnesia-chrome bricks or panels and are used extensively in the steel industry.

The normal destruction of basic refractories in service in steel furnaces is mainly caused by reaction with iron oxides and slags deposited on their faces, failure under load, spalling of the faces, and in some instances mechanical breakage. The normal exposure of the brick in the furnace where it is readily attacked by the iron oxides and slags at the high operating temperatures poses a serious problem.

The problem at present has been greatly enhanced by the use of oxygen lances and free oxygen in the burners in the open hearth furnaces in order to obtain increased steel production and still use the available equipment by having recourse to basic brick in which the magnesia content has risen to 65% and in some instances as high as 80%. Heat sizes have increased tremendously, higher firing rates are being used and additional servicing equipment has been furnished in order to minimize delays and improve furnace efficiency. In changing over to the use of oxygen in the normal open hearth furnace, the normal speeds of reaction and production have been changed upwards to result in a rapid change in the rate of reaction due to the introduction of oxygen with a resultant increase of tonnage produced from such a unit and thereby cause a more rapid deterioration of the basic refractory employed therein. The normal improvement that may be expected from the use of oxygen is an improvement of 10 to 25% in heat time and a saving in fuel of from 18 to 35%. Due to the speeding up of the rates of the reactions in the furnace, the temperatures created therein must be more closely watched in order to preclude serious damage to the furnace lining with a subsequent loss of time for necessary repairs. One of the items that has been a boon to the use of oxygen with the resultant high variations in temperatures has been the development of high magnesia content basic brick and the further development, discovery and use of a furnace refractory repair technique in which a suitable slurry material may be sprayed upon the walls and roofs of the furnaces during operation when they become deteriorated to a certain point and thus restore them to their normal usefulness for a longer period of time.

In research conducted over a period of years to determine what can be done to protect furnace linings and increase their life, it has been discovered that the iron oxide and slag which is deposited on the face of the refractory linings react with the ingredients in the compositions of the linings to change the composition of said ingredients and so result in other compounds. This change is mainly affected by the following variables which are presented in their order of importance in their effect on the reactions which take place:

(a) Composition of the brick
(b) Amount of iron and the positioning thereof that is used for reinforcing and/or supporting the brick structure contained in the roof and walls per unit of area
(c) Iron oxide and slag film deposited as a coating on the face of the brick The above variables will cause a chain reaction within the refractory lining to change the composition of said lining and thus cause fusing, spalling and peeling. A serious defect in the refractory linings now employed is their inability to remain in a stable state and not react with the iron, iron oxide and slag coatings, and thus change their composition under the influence of the furnace heat to thus deteriorate to a lower refractory product. It is with this background in mind that the instant invention was conceived to improve the refractoriness of the surface so as to give longer life to the furnace lining, and the invention is predicated on the ability of the furnace lining to react with the iron contained therein and the iron oxide and slag coatings formed thereon and, in addition, on the ability of any coating which may be suitably placed and retained on said lining to form thereon a protective highly refractory surface which will react with the parent refractory and/or the iron oxide and slag formed thereon. In addition the iron oxide contained on the surface is utilized as a catalyst to assist in the reaction which takes place to form the high refractory coating.

In the use of oxygen in the furnaces by means of lances or pipes, extreme splashing and fuming is encountered as the oxygen is actually blown into the furnace and has given rise to even more problems due to the damage to the refractory linings contained therein. As a result of deposits of slag and other fluxing materials, the refractory surface is destroyed by fluxing, peeling and spalling.

The main furnace characteristics and operating conditions which affect the quantity and composition of the fluxing oxides and slag deposits on the refractory lining face are as follows:

(1) Furnace width
(2) Furnace length
(3) Size of metal pool
(4) Burner entrance angle
(5) Air to fuel ratio (oxygen may be also introduced in the burner)
(6) Fuels and fuel characteristics
(7) Use of oxygen lance or pipe (its design and location and volume of oxygen and period of blow)
(8) Distance between bed and roof line
(9) Type and composition of steel encased and supported basic refractory brick or panel
(10) Quantity of lime
(11) Ore, scrap and hot metal additions It can readily be seen therefore that, under these severe service conditions, failure under load, fusing, spalling and peeling is influenced to a large degree by the above conditions. One of the main causes of failure in most instances has been the spalling of the refractory lining due to thermal shock and also to the reaction with the iron oxides and slags formed on the face thereof.

The prime purpose of this invention is to make it possible to repair these spalled or damaged areas in furnace linings composed of basic refractories without the necessity of lowering the temperature of the furnace or interrupting production. It is self-evident that the furnace would only have to be shut down when the refractory lining has deteriorated to such an extent as to make it uneconomical to repair due to the high volume of repair materials which would be necessary.

It is therefore proposed to spray the instant composition upon the flame exposed hot surface of the basic refractory furnace roofs and walls while the furnace is in full operation and which will react as follows:

(1) The composition is in the form of a plastic slurry and thus when sprayed upon the hot refractory lining the plastic slurry makes intimate contact with the lining and thus holds the slurry on said lining.

(2) As moisture is evaporated out of the plastic slurry by the heat in the refractory lining, the binding agents contained in the instant composition take over and hold the composition on the surface of the lining as the temperature rises to such a point as to activate some of the ingredients and thereby react with the existing refractory material of the basic lining to form an integrated refractory coating thereon. The reaction thus causes the formation of refractory compounds which are of a higher refractory nature than the actual ingredients of the instant composition.

The instant composition disclosed herein is particularly suitable for basic refractory linings containing predominant amounts of magnesia and is composed mainly of similar ingredients rather than of other ingredients which would react eventually with the parent refractory. The main concept of the invention was to evolve a new composition which would be composed mainly of the ingredients in the parent refractory but prepared in suitable form for application thereon in the form of a spray, said composition furthermore being so constituted as to insure its retention upon the hot flame exposed surface of the refractory lining. Another feature was to produce a still more durable lining which will permit the furnace roof and wall repairs to be made at much longer intervals. In making repairs, the ingredients of the instant composition may be varied so as to be compatible with the refractory lining and still be of a higher refractory nature than the lining itself. When the instant composition is used, the amount of repairing is greatly reduced, and the length of time over which the furnace may be operated without the necessity of cooling and rebuilding is extended considerably. Moreover, the furnace may be operated at higher temperatures, resulting in quicker melts with greater production per furnace than can now be accomplished.

In basic furnaces, magnesia and magnesia-chrome are ordinarily used in prefabricating refractory units (bricks and panels) of lining the furnace because of the high melting point of magnesia, but no one has found a practical way to prepare a predominantly magnesia composition to allow it to be mixed in the form of a grog or mix suitable for application to the flame exposed refractory surface of the roofs or walls by spraying.

In accordance with the instant invention, it has been found that substantial amounts of magnesia may be bonded beneficially to the surface of a refractory furnace lining, when such lining is of a highly basic character, in such a form as to produce a still higher refractory lining, by mixing a suitable amount of magnesia with a suitable amount of chrome ore. The chrome ore forms a matrix for a limited magnesia content and bonds said material to the basic furnace wall, while keeping the excess magnesia in place until new crystallization occurs under the high heat of the furnace, which high furnace heat will further bond the added magnesia in place and thus cause the deposition of a high refractory coating upon the furnace wall. Actually the refractory coating becomes a part of the parent refractory lining.

The composition of the instant invention, which may be used on a furnace lining with a heavy coating of iron oxide and slag and which may be mixed into a suitable grog and sprayed and retained on the refractory surface comprises:

10 to 40 parts of chrome ore
50 to 90 parts of free magnesia (dead burned or fused and in excess of the MgO contained in the chrome ore)
.1 to 10 parts of free iron oxide (added iron oxide in excess of the iron oxide contained in the chrome ore)
1 to 12 parts of binding agent
.1 to 10 parts of wetting agent (as part of binding agent)
1 to 10 parts of suspension agent The material should be finely ground or pulverized and it is extremely important that the ingredients of the composition be individually screen sized as per the following tables:

*Chrome Ore*

| | Percent |
|---|---|
| To pass 20 mesh screen | 100 |
| To remain on 100 mesh screen | 25–40 |
| To remain on 200 mesh screen | 35–50 |
| To remain on 325 mesh screen | 40–60 |
| To pass through 325 mesh screen | 40–60 |

*Magnesia Oxide*

| | Percent |
|---|---|
| To pass 12 mesh screen | 100 |
| To remain on 100 mesh screen | 50–85 |
| To remain on 200 mesh screen | 70–90 |
| To remain on 325 mesh screen | 80–95 |
| To pass through 325 mesh screen | 5–20 |

The grain size is of extreme importance in the instant composition in order first to allow the composition to be sprayed in the form of a plastic slurry and, second, to cause the composition to remain upon the furnace wall or roof after spraying. The larger grain sizes act as strengthening members and the graded intermediate and finer sizes fill in the interstices to build up a strong coating. In addition the large grains serve as mechanical bridges and rapidly tie the coating to the parent coating and refractory lining. The grains of the larger sizes in addition, due to their size and placement in relation to and in conjunction with the graded smaller grains, also act as breathers for the sprayed coating when first applied to the hot surface of the furnace roof or wall and allow the vapor generated therein to escape therethrough. Thus, the vapor generated as the coating is sprayed onto the hot surface is allowed to escape through said coating and hence is prevented from blowing off the coating.

In the preparation of the slurry for spraying, 20 to 40% by weight of water is added, and the composition thoroughly mixed into a sprayable plastic slurry. The slurry is sprayed upon the walls and roofs while the furnace is in full heat. By applying successive thin coatings of the composition to the heated surfaces, each coating is thereby subjected to the full heat of the furnace, thus permitting the interaction between the sprayed coatings and/or the iron oxide and the basic refractory lining to occur step by step. In this way, the ingredients of the composition of each successive coating are blended first with the basic refractory lining and then with each other and thereby produce a highly refractory magnesia-chrome coating. The intercrystalline reaction which takes place causes the coating to become a monolithic mass with the underlying refractory lining, the whole action occurring in a very short period of time and without unduly affecting the temperature of said lining.

The chrome ore that may be used in the preparation of the composition may be any chrome ore that falls within the following limits:

| | Percent |
|---|---|
| $Cr_2O_3$ | 25 to 45 |
| FeO | 10 to 28 |
| MgO | 8 to 20 |

In general there will also be oxides of aluminum and silica in varying amounts present in the chrome ore but these oxides are not considered for the functional reaction of the composition. There will also be magnesia oxide in the chrome ore in the amounts stipulated above but these oxides are usually not in a readily useable form, so that it is necessary to add the additional free magnesia required in the form of dead burned or fused magnesia which is MgO in its most refractory form and having a fusing temperature of around 4000° F.

In actual operation, as the plastic slurry is sprayed on the flame exposed face of the hot basic refractory lining, the chrome ore, magnesia oxide and iron oxide, having previously been intimately and thoroughly mixed together, are in intimate contact with each other in said slurry. The initial stage in the spraying is the holding or bonding of the composition on the hot refractory surface due to its plastic form, which form rapidly changes as the moisture is evaporated under the high heat from the refractory lining. The binding agents then take over to hold the ingredients of the composition on the hot surface until such time as the temperature of the ingredients becomes sufficiently high to cause reactions with the ingredients contained in the existing refractory lining and/or with the oxides on the face thereof and form spinels and other compounds which are of a higher refractory nature than the initial composition.

The coating with the new structure of compounds and spinels as thus formed directly on the face of the existing lining presents increased refractoriness and will withstand very high heats and wide temperature differentials and still be resistant to spalling. The iron oxide which exists on the magnesia-chrome linings or which is added to the instant composition acts as a catalyst under furnace heat and causes reactions to take place which unite the sprayed slurry with the basic refractory lining and any oxides contained on its surface.

The binding agent may be one of the more conventionally known binders such as sodium silicate wherein the sodium to silicate ratio may be anywhere from 1 to 2 but preferably should be 1 to 1.9 (an example being $Na_2O$ 1.9 $SiO_2$).

A suitable wetting agent for causing and controlling the dispersion and surface action and wetting may be any one of the known wetting agents such as Santomerse #1 or #85 (alkyl amyl sulfonate) or Alkanol H C (ethylene oxide condensate of high molecular weight fatty acid) or similar sulfonants are incorporated or added to the binder to provide wetting and penetration.

The suspension agent may be "bentonite" which functions as an inorganic suspending and fluxing agent when the fluxing action is desirable. Organic suspenders such as methyl cellulose polyvinyl alcohol, gum arabic or the like may be substituted if so desired.

The binding and wetting agents serve to improve the action of the composition on the furnace lining by causing it to adhere more closely to the lining when first sprayed and so place the coating in close relation to and in intimate contact with said lining and thus cause rapid heat transfer to take place and thus cause the moisture to be rapidly evaporated and then interaction to take place as the coating is heated.

By adjusting the ingredients of the instant composition to match or make them compatible with the basic refractory lining, it is possible to produce the desired results especially where temperature differentials are to be continually encountered or where there are other extreme conditions to contend with. By using the correct proportions of the ingredients in the preparation of the composition, it is possible to vary the highest temperature which the composition will withstand and in addition allow the composition to remain upon the furnace lining during furnace operation. In addition, it is possible to vary the composition to compensate for the actual ingredients in the refractory furnace lining within the limits of the basic refractories usually employed.

In preparing the instant composition for spraying, suitable screen sized ingredients are intimately and thoroughly mixed in proper proportions and then sufficient water at the proper temperature is added to give the desired consistency which may be sprayed through conventional spraying equipment upon the hot flame exposed surface of the basic refractory furnace lining. The use of heated water (preferably 90° to 190°) or the heating of the mass assists in and assures a complete and intimate intermixing, dissolving or dispersing of the ingredients and in addition allows the composition to be sprayed through the gun onto the furnace lining at a uniform rate.

In the normal use in spraying and repairing furnace linings the following may be effected:

(1) Repair of worn, eroded or spalled spots or areas.

(2) Repairs as above to be accomplished first, then whole furnace area may be covered if necessary to protect lining.

(3) If so desired the whole area of furnace may be covered at the start of a campaign to provide a coating which will resist spalling.

(4) If during a campaign it is necessary to close down a furnace and drop the temperature therein for any reason for a long period of time, the whole area may be covered while still hot to prevent moisture absorption on cooling.

What is claimed is:

1. A sprayable coating composition for repairing hot basic refractory linings of high temperature furnaces while the furnaces are in operation consisting essentially of an aqueous slurry of sprayable consistency containing refractory material composed of chrome ore and free magnesia, the amount of magnesia being materially greater than the amount of chrome ore, and the amount of chrome ore being at least 10 parts by weight of the refractory material, the particle size of the chrome ore being such that all of the ore will pass through a 20 mesh screen, 25% to 40% will remain on a 100 mesh screen, 35% to 50% will remain on a 200 mesh screen, 40% to 60% will remain on a 325 mesh screen and 40% to 60% will pass through a 325 mesh screen, and the particle size of the magnesia being such that all of the magnesia will pass through a 12 mesh screen, 50% to 80% will remain on a 100 mesh screen, 70% to 90% will remain on a 200 mesh screen, 80% to 95% will remain on a 325 mesh screen and 5% to 20% will pass through a 325 mesh screen.

2. A sprayable coating composition as recited in claim 1, wherein the composition also contains from .1 to 10 parts by weight of iron oxide in excess over that present in the chrome ore.

3. A sprayable coating composition as recited in claim 1, wherein the slurry contains from 20% to 40% by weight of water and the binding agent is sodium silicate.

4. A sprayable coating composition for repairing hot basic refractory linings of high temperature furnaces while the furnaces are in operation consisting essentially of an aqueous slurry of sprayable consistency, containing refractory material composed of 10 to 40 parts by weight of chrome ore, 50 to 90 parts by weight of free magnesia and 0.1 to 10 parts by weight of free iron oxide, said slurry also containing 1 to 12 parts by weight of a binding agent, 0.1 to 10 parts of a wetting agent as part of the binding agent, and 1 to 10 parts of a suspension agent, the chrome ore being of a particle size such that all of the ore will pass through a 20 mesh screen, 25% to 40% will remain on a 100 mesh screen, 35% to 50% will remain on a 200 mesh screen, 40% to 60% will remain on a 325 mesh screen, and 40% to 60% will pass through a 325 mesh screen, and the magnesia being of a particle size such that all of the magnesia will pass through a 12 mesh screen, 50% to 85% will remain on a 100 mesh screen, 70% to 90% will remain on a 200 mesh screen, 80% to 95% will remain on a 325 mesh screen, and 5% to 20% will pass through a 325 mesh screen.

5. A sprayable coating composition according to claim 4 wherein the amount of water in the aqueous slurry is from 20% to 40% by weight.

6. A method for repairing the hot basic refractory linings of high temperature furnaces while the furnaces are in operation, said linings being formed of a magnesia-chrome material containing a predominant amount of up to 80% of magnesia, comprising spraying the hot flame exposed faces of said linings with an aqueous slurry of sprayable consistency containing refractory material composed of free magnesia and chrome ore in relative amounts substantially matching the relative amounts of the magnesia and chrome ore present in said linings, the chrome ore present in said slurry having a particle size such that all of the ore will pass through a 20 mesh screen, 25% to 40% will remain on a 100 mesh screen, 35% to 50% will remain on a 200 mesh screen, 40% to 60% will remain on a 325 mesh screen and 40% to 60% will pass through a 325 mesh screen, and the magnesia present in said slurry having a particle size such that all of the magnesia will pass through a 12 mesh screen, 50% to 80% will remain on a 100 mesh screen, 70% to 90% will remain on a 200 mesh screen, 80% to 95% will remain on a 325 mesh screen and 5% to 20% will pass through a 325 mesh screen.

7. A sprayable coating composition according to claim 4, wherein the binding agent is sodium silicate with a sodium to silicate ratio of 1 to 1.9, the wetting agent is alkyl amyl sulfonate, and the suspension agent is bentonite.

8. A method for repairing the hot basic refractory linings of high temperature furnaces while the furnaces are in operation, comprising spraying the hot flame exposed faces of said linings with a composition consisting essentially of refractory material comprised of 10 to 40 parts of chrome ore, and 50 to 90 parts of free magnesia, said composition also containing 1 to 12 parts of a binding agent, .1 to 10 parts of a wetting agent as part of the binding agent and 1 to 10 parts of a suspension agent, all of the ingredients being pulverized to a suitable screen sizing and throughout and intimately mixed with 20% to 40% by weight of water.

9. A method for repairing the hot basic refractory linings of high temperature furnaces while the furnaces are in operation, comprising spraying the hot flame exposed faces of said linings with a composition consisting essentially of refractory material comprised of 10 to 40 parts of chrome ore, 50 to 90 parts of free magnesia, and .1 to 10 parts of iron oxide, said composition also containing 1 to 12 parts of a binding agent, .1 to 10 parts of a wetting agent as part of the binding agent and 1 to 10 parts of a suspension agent, all of the ingredients being pulverized to a suitable screen sizing and thoroughly and intimately mixed with 20% to 40% by weight of water.

10. A method for repairing the hot basic refractory linings of high temperature furnaces while the furnaces are in operation, comprising spraying the hot flame exposed faces of said linings with a composition consisting essentially of refractory material comprised of 10 to 40 parts of chrome ore, and 50 to 90 parts of free magnesia, all of the ingredients being pulverized to a suitable screen sizing and thoroughly and intimately mixed with 20% to 40% by weight of water.

11. A method for repairing the hot basic refractory linings of high temperature furnaces while the furnaces are in operation, comprising spraying the hot flame exposed faces of said linings with a composition consisting essentially of refractory material comprised of 10 to 40 parts of chrome ore, 50 to 90 parts of free magnesia, and .1 to 10 parts of iron oxide, all of the ingredients being pulverized to a suitable screen sizing and thoroughly and intimately mixed with 20% to 40% by weight of water.

References Cited in the file of this patent

UNITED STATES PATENTS

| | | |
|---|---|---|
| 2,358,652 | Nicholas | Sept. 19, 1944 |
| 2,809,126 | Murphy et al. | Oct. 8, 1957 |

UNITED STATES PATENT OFFICE
CERTIFICATE OF CORRECTION

Patent No. 3,093,497                           June 11, 1963

Raymond J. Demaison

It is hereby certified that error appears in the above numbered patent requiring correction and that the said Letters Patent should read as corrected below.

Column 7, line 29, for "throughout" read -- thoroughly --.

Signed and sealed this 24th day of December 1963.

(SEAL)
Attest:

ERNEST W. SWIDER

Attesting Officer

EDWIN L. REYNOLDS

Acting Commissioner of Patents